UNITED STATES PATENT OFFICE.

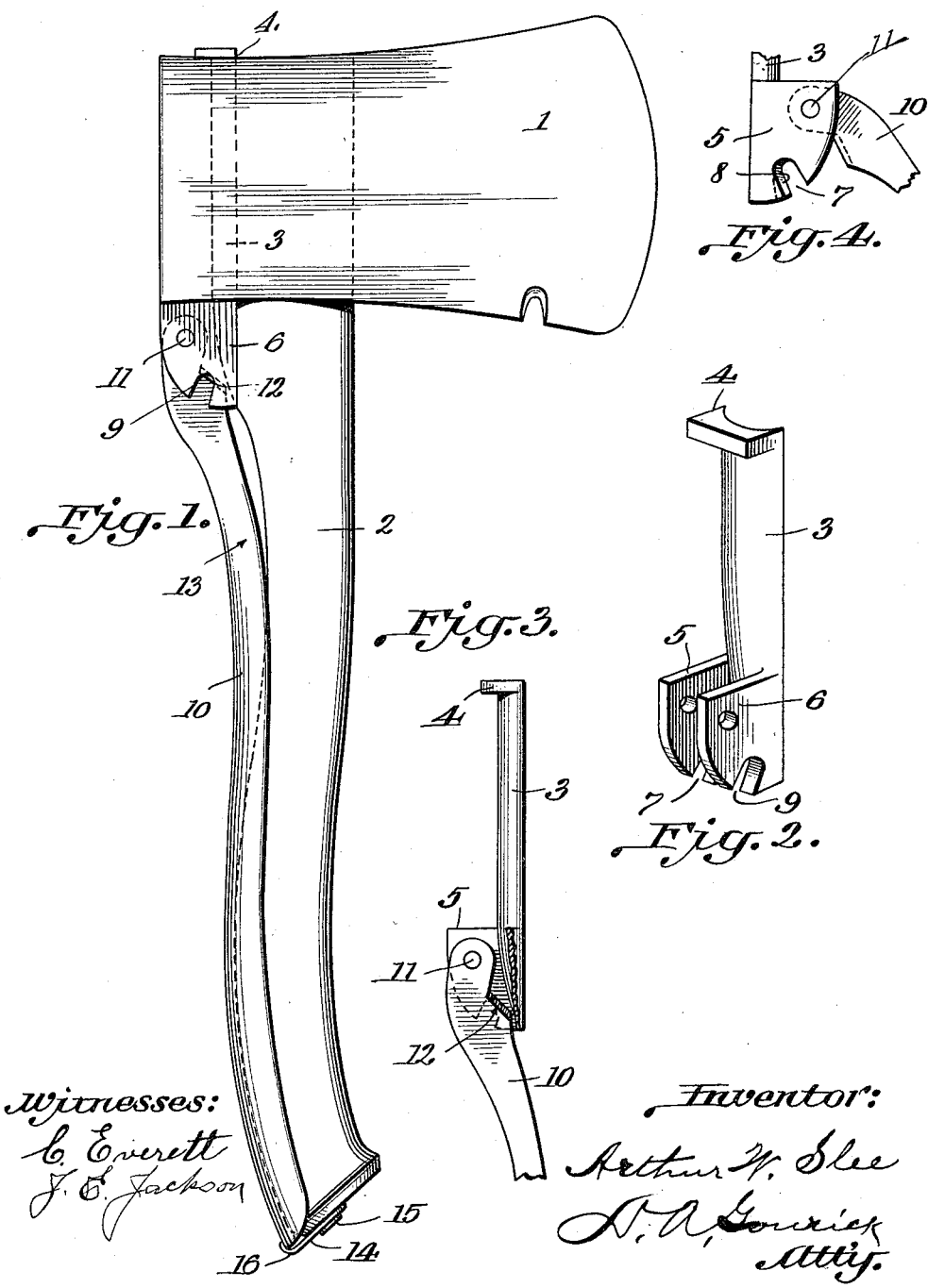

ARTHUR W. SLEE, OF BROOKLYN, NEW YORK.

WIRE-CUTTER ATTACHMENT.

1,164,765.          Specification of Letters Patent.      Patented Dec. 21, 1915.

Application filed July 20, 1915. Serial No. 40,956.

*To all whom it may concern:*

Be it known that I, ARTHUR W. SLEE, a citizen of the United States, residing at Brooklyn, in the county of Kings and State of New York, have invented certain new and useful Improvements in Wire-Cutter Attachments, of which the following is a specification.

This invention relates to wire cutters, and is more particularly a wire cutter attachment for a short handle ax, and has for its object the provision of an attachment that may be attached to any short handle ax and which will not interfere with the use of the ax for ordinary purposes.

Another object is the provision of a wire cutter that will have improved cutting edges, and an operating lever that is so constructed that it follows the contour of the ax handle.

Other objects such as simplicity, cheapness of manufacture, durability and the general improvement of the art will be carefully brought out in the following specification and drawings, in which:

Figure 1 is a flat side view of my device attached to a short handle ax. Fig. 2 is a perspective view of the shank. Fig. 3 is a fragmentary view of the shank partly in section with one ear removed and showing the cutting edge of the operating lever, and Fig. 4 is a fragmentary view of the shank showing the cutting edge in the slot of one of the ears.

Referring more particularly to the drawings, the numeral 1 designates the ax head. An ordinary handle 2 is secured in the head in the usual manner.

The wire cutter attachment consists of a shank 3 having a head 4 on its upper end and ears 5 and 6 on its lower end and a lever 10. In the outer edge of the ear 5 is a wire receiving slot 7 which has a cutting edge 8 formed by an outward bevel. The ear 6 also has a slot 9 which is slightly larger than the slot in the ear 5 and is not provided with a cutting edge. An operating lever 10 is pivoted at 11 and has a beveled cutting edge 12 which is opposite to the bevel on the slot 7. The upper portion of the lever 10 is solid down to approximately the point designated by 13 and the rest of it is concave and follows the contour of the ax handle. A spring catch 14 is secured to the free end of the ax handle by a screw 15 and engages the operating lever 10 at 16 to hold it in position.

To attach the wire cutter to an ordinary ax it is only necessary to remove the ax head from the handle, cut away a small portion of the front edge of the handle, adjacent the top and insert the part 3 of the cutter into the eye of the ax, catching the portion 4 over the head of the ax, and then drive the ax handle into place.

While I have shown and described my invention in combination with an ax it will be understood that it may be used in combination with other articles, but it is more particularly designed to be used in combination with short handle axes carried by infantry men and members of hospital corps, for cutting barbed wire entanglements and where, as is not infrequently the case, such entanglements are charged with electricity any well known means of insulation may be used on the device to safeguard the operator.

Having thus described my invention what I claim is:

1. A wire cutter attachment comprising a shank having one side convex and the opposite side concave, ears formed on the convex side of said shank, a head on said shank, and an operating lever pivoted between said ears.

2. A wire cutting attachment for axes comprising a shank adapted to be inserted in the eye of an ax, a head on said shank to extend over the head of the ax, a pair of ears having slots in their outer edges formed on said shank, one of said slots having a cutting edge, and an operating lever pivoted between said ears.

3. A wire cutting attachment for axes comprising a shank adapted to be inserted in the eye of an ax, a head on said shank to extend over the head of the ax, a pair of ears having slots in their outer edges formed on said shank one of said slots having a cutting edge, an operating lever pivoted between said ears, and a cutting edge formed on said lever adjacent its upper end so as to co-act with the cutting edge on the slot.

4. A wire cutting attachment for axes comprising a shank adapted to be inserted in the eye of an ax, a head on said shank adapted to extend over the ax head, a pair of ears having slots therein formed on said shank, and an operating lever pivoted between said ears having a cutting edge adjacent its upper end, said operating lever being concave and following the general contour of the ax handle.

In testimony whereof I hereto affix my signature in the presence of two witnesses.

ARTHUR W. SLEE.

Witnesses:
 FREDERICK H. WAGNER,
 EMILIE M. MARTIN.

Copies of this patent may be obtained for five cents each, by addressing the "Commissioner of Patents, Washington, D. C."